United States Patent [19]
Jester et al.

[11] 4,050,129
[45] Sept. 27, 1977

[54] MILLING CUTTER

[75] Inventors: Willi Jester, Herten-Westerholt; Hans Tack, Heiligenhaus, both of Germany

[73] Assignee: Fried. Krupp Gesellschaft mit beschrankter Haftung, Essen, Germany

[21] Appl. No.: 691,445

[22] Filed: June 1, 1976

[30] Foreign Application Priority Data
June 12, 1975 Germany .............................. 2526345

[51] Int. Cl.² .............................................. B26D 1/12
[52] U.S. Cl. ........................................ 407/45; 407/49; 407/113
[58] Field of Search .............. 29/96, 97, 105 A, 105 R

[56] References Cited
U.S. PATENT DOCUMENTS

| 2,155,337 | 4/1939 | Speckert | 29/96 |
| 2,900,705 | 8/1959 | Walker | 29/96 |
| 3,138,847 | 6/1964 | Berry, Jr. | 29/105 R |
| 3,200,474 | 8/1965 | Kralowetz | 29/105 R |
| 3,324,529 | 6/1967 | McCreery | 29/96 |
| 3,332,130 | 7/1967 | Armstrong | 29/105 A |
| 3,359,612 | 12/1967 | Mina | 29/105 A |
| 3,757,397 | 9/1973 | Lindsay | 29/105 R |
| 3,847,555 | 11/1974 | Pegler et al. | 29/105 A |

*Primary Examiner*—Harrison L. Hinson
*Attorney, Agent, or Firm*—Spencer & Kaye

[57] ABSTRACT

A milling cutter has a cutter body, a plurality of stops received in the cutter body, an adjusting device for separately axially displacing each stop, a cutter blade received in each stop and a wedge member associated with each stop for tightening each cutter blade to the respective stop. The adjusting device comprises a projection which is attached to and extends from each stop and which is received in a recess provided in the cutter body, at least two axially oriented clamping faces which form part of each projection and which are inclined with respect to one another and set screws cooperating with each clamping face. Each set screw is supported in the cutter body in a substantially radial orientation with respect to the axis of the cutter body. Each clamping face is obliquely disposed with respect to the orientation of the associated set screw for effecting an axial shift of the stop upon tightening the respective set screw.

7 Claims, 9 Drawing Figures

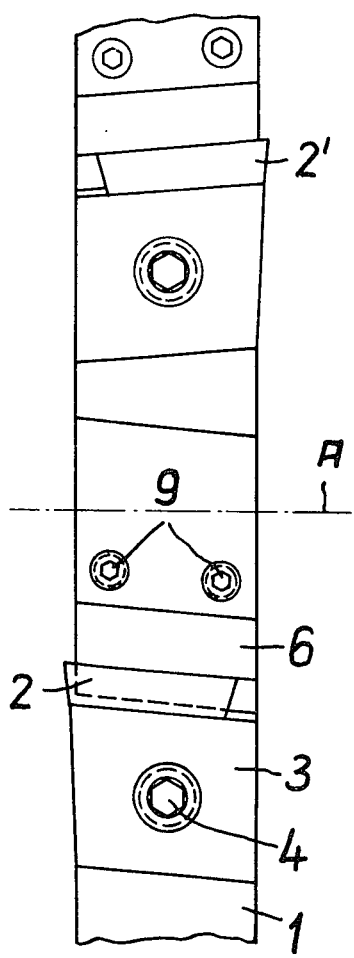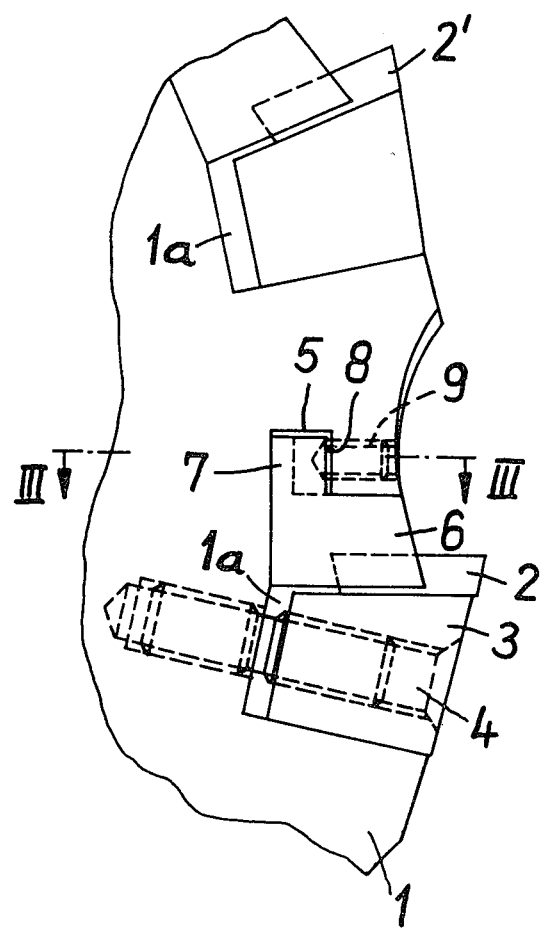

FIG.3
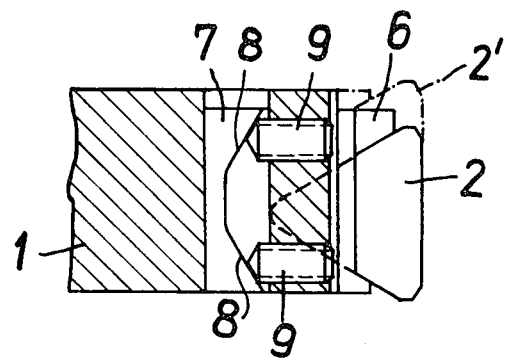
FIG.4
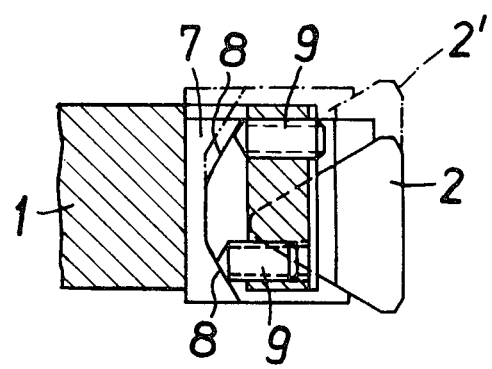

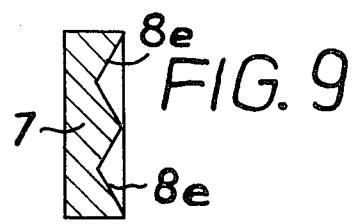

MILLING CUTTER

BACKGROUND OF THE INVENTION

This invention relates to a milling cutter of the disc type that has replaceable cutter blades (indexable inserts) which are received in a transversely adjustable stop and which are immobilized in the cutter body by means of a clamping wedge.

Disc-type milling cutters (slatting cutters) for milling shoulders or open grooves are generally made of high speed steel or have hard metal blades soldered to the cutter body. The cutting edges of the blades are reground after a certain wear. Contrary to regrindable milling cutters, disc-type milling cutters having replaceable and reversible cutter blades cannot be made to have a cutting path of very high accuracy. Since there are usually stringent requirements regarding the accuracy of lateral travel, particularly the milling width when grooves are milled, it is advantageous if the cutter blades are laterally adjustable.

Accordingly, there are known disc-type milling cutters which include an element for positioning a three-edge cutting blade. This element has, in the radial direction, a pin which projects into a recess provided in the cutter body. The pin in engageable by two setting screws, one provided transversely in each lateral face of the cutter body, whereby a tightening and a transverse adjustment of the element, together with the cutter blade is possible.

The above-outlined adjusting arrangement has the disadvantage that the set screws effect directly the transverse adjustment, whereby an accurate fine setting of the milling width cannot be achieved. Further, disc-type milling cutters are often mounted and inserted on a milling spindle as a joint assembly. If corrections in the milling width are necessary, particularly when worn or broken components are replaced, the setting and tightening screws arranged laterally in the cutter body are not accessible so that the entire milling spindle has to be dismantled. This disadvantage leads to a significant idling period of the milling machine. Further, the adjustable arrangement of the pins in the recess results in an unstable support of the element and the cutter blade positioned therein.

SUMMARY OF THE INVENTION

It is an object of the invention to provide a disc-type milling cutter with replaceable cutter blades from which the above-explained disadvantages are eliminated and which makes possible an accurate fine adjustment of the milling width, which further provides for an access to the tightening and setting elements from the circumferential side of the cutter body and which makes possible a stable positioning of the support element, together with the cutter blade.

These objects and others to become apparent as the specification progresses are accomplished by the invention, according to which, briefly stated, the milling (slatting) cutter has a disc-shaped cutter body, a plurality of stops received in the cutter body, an adjusting device for separately axially displacing each stop, a cutter blade (indexable insert) received in each stop and a wedge member associated with each stop for tightening each cutter blade to the respective stop. The adjusting device comprises a projection which is attached to and extends from each stop and which is received in a recess provided in the cutter body, at least two axially oriented clamping faces (adjusting faces) which form part of each projection and which are inclined with respect to one another and set screws cooperating with each clamping face. Each set screw is supported in the cutter body in a substantially radial orientation with respect to the axis of the cutter body. Each clamping face is obliquely disposed with respect to the orientation of the associated set screw for effecting an axial shift of the stop upon tightening the respective set screw.

The stop in which the cutter blade is positioned constitutes a significant characteristic feature of the invention. The projection of the stop may be situated either on the side of the cutting face or on the opposite side, so that the cutter blade may be clamped either from the direction of the support face or the cutting face.

According to an advantageous embodiment of the invention, the projection of the stop is disposed at an angle of 90° to the body of the stop. The projection extends into a recess of the milling cutter in such a manner that it is in contact with the floor of the recess and abuts a wall which bounds the recess and which is arranged at an angle of 90° with respect to the recess floor. The stop is adjustable parallel to the axis of the milling cutter by means of two set screws supported radially in the milling cutter body. The set screws have a conical tip and exert a force on two oblique clamping faces which are provided on the projection of the stop and which incline towards one another in a direction away from or towards the set screws. Each clamping face is further arranged obliquely with respect to the orientation at the associated set screw. By loosening one of the screws and tightening the other, the stop can be transversely (axially) adjusted by fine setting (by virtue of the cam-action between set screw and clamping face) and thus the cutter blade which is positioned in the stop and which is immobilized by a clamping wedge can be accurately set in a direction parallel to the axis of the milling cutter. Dependent upon the dimensions of the tool, the milling width may be changed by as much as 1 to 2 mm without the necessity of using another cutter body.

The two inclined clamping faces provided on the projection of the stop may have a convex or concave configuration, or may form the sides of a trapezoid. Or, they may form a side wall of separate wedge-shaped (triangular) recesses. Such shapes are particularly easily obtainable by machining.

BRIEF DESCRIPTION OF THE DRAWINGS

FIG. 1 is a fragmentary top plan view of the circumference of a disc-type milling cutter incorporating the invention.

FIG. 2 is a fragmentary side elevational view of the structure shown in FIG. 1.

FIG. 3 is a sectional view taken along line III—III of FIG. 2 showing the structure adjusted for a minimum milling width.

FIG. 4 is a sectional view taken along lines III—III of FIG. 2 showing the structure adjusted for a maximum milling width.

FIGS. 5, 6, 7, 8 and 9 illustrate various possible shapes of the clamping faces according to the invention.

DESCRIPTION OF THE PREFERRED EMBODIMENTS

Figure 5:
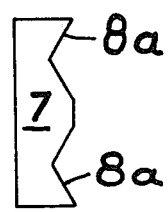
Figure 6:
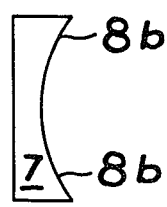

Turning now to FIG. 1, there is shown the circumference of a disc-type milling cutter body 1 which has an axis A and a plurality of circumferentially spaced openings 1a provided in its periphery. Each opening 1a accommodates a stop 6 which receives a cutter blade 2 or 2'. Each cutter blade can be immobilized by an associated clamping wedge 3 which is also received in the opening 1a and which presses the cutter blade against the stop by means of a tightening screw 4.

Each stop 6 is adjustable transversely to the circumference of the cutter, that is, parallel to the cutter axis A. Such an adjustment of each stop 6 is effected by an arrangement shown in FIGS. 2, 3 and 4. The stop 6 has a projection 7 which extends at an angle of 90° with respect to the body of the stop. The projection 7 extends into a recess 5 which is a generally circumferentially oriented, cavity-like extension of each respective opening 1a. The recess 5 and the projection 7 are arranged in the milling cutter 1 at that side of the stop 6 which is oriented away from the associated cutter blade 2. Set screws 9 provided in the cutter body exert a pressing force with their conical tips on the clamping faces 8 of the projection 7. Because of the oblique arrangement of the axially oriented clamping face with respect to the associated set screw, the pressing force has a force component which urges the stop 6 in a direction parallel to the axis A.

FIGS. 3 and 4 each illustrate a section taken through the projection 7 in the zone of the set screws 9. While in FIG. 3 the set screws have been so turned that they assume an equal height position in their socket, in FIG. 4, by unscrewing the upper screw and tightening the lower screw, the projection 7 and thus the stop 6 are displaced downwardly. It is seen — by comparing FIG. 3 with FIG. 4 — that the cutter blade 2 is shifted approximately 2 mm transversely relative to the cutter body 1. In FIGS. 3 and 4 the dash-dot position of the stop 6 as well as the dash-dot position 2' of the cutter blade 2 indicates an adjustment of the cutter blade in a direction opposite to that shown in FIG. 4. It is noted that similarly, in FIGS. 1 and 2, the reference characters 2 and 2' indicate oppositely adjusted cutter blades.

While FIGS. 3 and 4 show the clamping faces 8 as being the sides of a recess of trapezoidal shape, FIGS. 5 to 9 show further possibilities of arranging the inclined clamping faces to be exposed to the camming action of the set screws 9.

Figure 7:
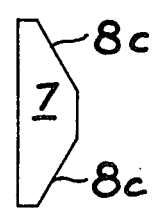
Figure 8:
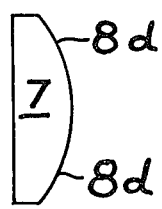

FIG. 5 illustrates two juxtapositioned triangular recesses, wherein walls 8a constitute the clamping faces that cooperate with the set screws 9. According to FIG. 6, the inclined clamping faces 8b are formed by a concave surface. In FIG. 7 the projection 7 has a trapezoidal shape; the sides 8c of the trapezoid form the clamping faces which, contrary to the embodiments of FIGS. 2-6, incline towards one another in the direction of the set screws. In FIG. 8, the inclined clamping faces 8d are formed by a convex surface. FIG. 9 shows two juxtapositioned conical recesses, where wall portions 8e constitute the clamping faces.

It will be understood that the above description of the present invention is susceptible to various modifications, changes and adaptations, and the same are intended to be comprehended within the meaning and range of equivalents of the appended claims.

What is claimed is:

1. In a milling cutter including a disc-shaped cutter body having an axis; means defining a plurality of circumferentially spaced openings provided in the periphery of the cutter body; a separate stop received in each opening of the cutter body; a cutter blade received in each stop and being axially adjustable therewith; and a separate wedge member received in each opening of the cutter for tightening each cutter blade to the respective stop; the improvement comprising
    a. means defining a recess forming a generally circumferentially oriented extension of each said opening;
    b. a projection attached to and extending from each stop at an angle of 90° with respect thereto; said projection being received in the respective recess;
    c. at least two axially oriented clamping faces forming part of each said projection; said clamping faces being inclined with respect to one another; and
    d. a separate set screw cooperating with each clamping face; each set screw being supported in said cutter body in a substantially radial orientation with respect to said axis and protruding into the respective recess; each clamping face being obliquely disposed with respect to the orientation of the associated set screw for effecting an axial shift of said stop upon tightening the respective set screw.

2. A milling cutter as defined in claim 1, wherein said clamping faces are constituted by the sides of a recess of trapezoidal cross section provided in said projection; said clamping faces inclining towards one another in a direction oriented away from said set screws.

3. A milling cutter as defined in claim 1, wherein said clamping faces are constituted by the sides of a trapezoidal portion of said projection; said clamping faces inclining towards one another in a direction oriented towards said set screws.

4. A milling cutter as defined in claim 1, wherein said clamping faces are constituted by a concave surface of a recess provided in said projection.

5. A milling cutter as defined in claim 1, wherein said clamping faces are constituted by a convex surface of a portion of said projection.

6. A milling cutter as defined in claim 1, wherein said clamping faces are constituted by a side of two juxtapositioned recesses of triangular cross section provided in said projection.

7. A milling cutter as defined in claim 1, wherein said clamping faces are constituted by a wall portion of two juxtapositioned conical recesses provided in said projection.

* * * * *